United States Patent [19]

Kaibuki et al.

[11] Patent Number: 5,033,163
[45] Date of Patent: Jul. 23, 1991

[54] MECHANISM FOR ATTACHING AN AUTOMOBILE DOOR

[75] Inventors: Shigeo Kaibuki; Shinpei Watanabe; Mitsuga Takahashi; Hiroshi Moriya, all of Sayama, Japan

[73] Assignee: Honda Giken Kogyo Kabushiki Kaisha, Tokyo, Japan

[21] Appl. No.: 439,887

[22] Filed: Nov. 21, 1989

Related U.S. Application Data

[62] Division of Ser. No. 305,512, Feb. 2, 1989, Pat. No. 4,907,331, which is a division of Ser. No. 73,589, Jul. 15, 1987, Pat. No. 4,860,424.

[30] Foreign Application Priority Data

| Jul. 15, 1986 | [JP] | Japan | 61-167360 |
| Jul. 15, 1986 | [JP] | Japan | 61-167362 |
| Apr. 22, 1987 | [JP] | Japan | 62-100777 |

[51] Int. Cl.$^5$ .............................................. E05D 5/10
[52] U.S. Cl. ..................... 16/386; 248/309.2; 411/39; 411/42; 411/43
[58] Field of Search ............... 29/11, 434, 453, 213.1, 29/252, 283.5, 255, 243.5; 16/257, 259, 262, 222, 386, 385, DIG. 13; 296/146, 202; 81/488; 269/52, 54.4, 54.5, 901; 248/686, 309.2; 411/39-43

[56] References Cited

U.S. PATENT DOCUMENTS

| 1,943,983 | 1/1934 | Meiners . | |
| 2,165,504 | 7/1934 | Pfauser . | |
| 2,183,842 | 12/1939 | Mandl . | |
| 2,956,468 | 10/1960 | Macy | 411/41 |
| 3,135,013 | 6/1964 | Parsons . | |
| 3,445,884 | 5/1969 | Dangauthier . | |
| 3,796,086 | 3/1974 | Phillips . | |
| 3,964,364 | 6/1976 | Poe | 411/43 |
| 4,050,831 | 9/1977 | DuBois . | |
| 4,375,342 | 3/1983 | Wollar et al. | 411/41 |
| 4,432,125 | 2/1984 | Monteleone et al. . | |
| 4,571,134 | 2/1986 | Beglinger et al. | 411/41 |
| 4,589,184 | 5/1986 | Asano et al. . | |
| 4,713,861 | 12/1987 | Bancroft | 16/222 |

FOREIGN PATENT DOCUMENTS

| 0149492 | 7/1985 | European Pat. Off. . | |
| 0177976 | 4/1986 | European Pat. Off. . | |
| 3126634 | 1/1983 | Fed. Rep. of Germany . | |
| 3400147 | 12/1985 | Fed. Rep. of Germany . | |
| 1370201 | 7/1964 | France | 411/41 |
| 2346538 | 10/1977 | France . | |
| 58-17104 | 4/1983 | Japan . | |
| 320524 | 10/1929 | United Kingdom . | |
| 717415 | 10/1954 | United Kingdom . | |
| 1027205 | 4/1966 | United Kingdom . | |
| 1128015 | 9/1968 | United Kingdom . | |
| 1155833 | 6/1969 | United Kingdom . | |
| 1295023 | 11/1972 | United Kingdom . | |
| 1307430 | 2/1973 | United Kingdom | 411/41 |
| 1486013 | 9/1977 | United Kingdom . | |
| 2055958 | 3/1981 | United Kingdom . | |
| 2090365 | 7/1982 | United Kingdom . | |
| 2146698 | 4/1985 | United Kingdom . | |
| 2160827 | 1/1986 | United Kingdom . | |

Primary Examiner—Mark Rosenbaum
Assistant Examiner—Frances Chin

[57] ABSTRACT

A hinge pin is temporarily held on a first hinge member on the automobile body by means of a hinge pin support mechanism. A door to be attached to the automobile body is held in position, and a second hinge member on the door is brought into engagement with the first hinge member. The hinge pin is pressed into the second hinge member through the first hinge member to couple the door to the automobile door. The hinge pin support mechanism includes a hinge pin retaining member including a ring separably joined to a plurality of legs. When the hinge pin is pressed into the hinge members, the ring is sheared off from the legs and rides in a peripheral groove defined in the hinge pin. The ring then engages one of the hinge members to prevent the hinge pin from being removed from the hinge members. The door can automatically be attached to the automobile body by a door attaching mechanism and detached from the automobile body by a door detaching mechanism.

4 Claims, 12 Drawing Sheets

MECHANISM FOR ATTACHING AN AUTOMOBILE DOOR

This application is a divisional of copending application Ser. No. 07/305,512, filed on Feb. 2, 1989 now U.S. Pat. No. 4,907,331 which is a divisional of application Ser. No. 07/073,589, filed on July 15, 1987 (now U.S. Pat. No. 4,860,424).

BACKGROUND OF THE INVENTION

The present invention relates to a method of and a mechanism for attaching and detaching an automobile door, and more particularly to a mechanism for attaching an automobile door by temporarily placing hinge pins on ends of hinge members on an automobile body. Thereafter, the hinge members are aligned on an automobile door with the hinge members on the automobile body with an assembling mechanism including door holder means. The hinge pins are pushed into the aligned hinge members to temporarily mount the door on the automobile body easily and reliably for the purpose of painting the door and the body together. After the door and the body have been painted, the hinge pins are automatically removed with hinge pin remover means and the door holder means to detach the door from the automobile body for the purpose of rigging the automobile body.

On automobile production lines, an automobile body and doors that are assembled are painted together in order to eliminate any irregular paint coating, then the doors are detached from the body for the purpose of outfitting the body, and thereafter the body and the doors are assembled together.

There has been employed a holder device for positioning and holding the door so that hinge members of the door and the body, after they have been rigged, will be suitably positioned relatively to each other for properly assembling the door and the body together. The holder device first positions the door while using the lower edge of the door as a reference. At this time, the door is held in position by utilizing an outer door portion including the lower edge of the door, or a door surface which will be positioned outside when the door is mounted on the body. More specifically, the lower edge of the door and the outer door portion are held by the holder device, and the holder device is moved toward the body to bring the hinge members of the door into engagement with the hinge members of the body. After hinge pins have been inserted into the hinge members, retaining means are attached to the hinge pins to couple the door to the body. Door holder jigs on the holder device are shaped complementarily to the configurations of the lower edge of the door and the outer door portion.

As described above, the hinge pins are inserted into the hinge members on the body and the door, and the retaining means are attached to the hinge pins to prevent them from dropping. Since the insertion of the hinge pins and the attachment of the retaining means are effected in a very small space between the body and the door, the efficiency is poor and the rate of production is lowered.

Japanese Utility Model Publication No. 58(1983)-17104 discloses an arrangement in which a hinge pin can be retained in place simply by inserting the hinge pin into a hinge member. More specifically, the hinge pin has a peripheral groove defined near one end thereof, and hinge pin retaining means can engage in the peripheral groove. The hinge pin retaining means comprises a ring-shaped member having one end smaller in diameter than the hinge pin and the opposite end larger in diameter than a hole defined in the hinge pin. The ring-shaped member has a recess extending axially to make the opposite end thereof resilient diametrically.

When the hinge pin and the hinge pin retaining means are inserted into the hole of the hinge member, the larger-diameter portion of the hinge pin retaining means is resiliently contracted diametrically upon passage through the hole of the hinge member. After the larger-diameter portion of the hinge pin retaining means has passed through the hole, it springs back to a diameter larger than the diameter of the hole. Even if the hinge pin inserted through the hinge members of the body and the door is moved in a direction to come off, one end of the larger-diameter portion of the hinge pin retaining means on the hinge pin engages the hinge member, thus preventing the hinge pin from dropping off.

With the hinge pin and the hinge pin retaining means constructed as above, however, the hinge pin is liable to be tilted with respect to the hinge member. Therefore, an undue load has to be applied to insert the hinge pin, or the hinge pin cannot be inserted in place.

Moreover, the hinge pin and the hinge pin retaining means are not suitable for automatic insertion of the hinge pin since it would be difficult to provide means for holding the hinge pin, and hence the projection efficiency is low.

Inasmuch as automobile doors are different in shape from automobile type to automobile type, as many differently shaped door holder jigs as the number of automobile types to be produced are required. Stocking such many different door holder jigs is not only uneconomical but also needs a large storage space. This is disadvantageous from the standpoint of effective utilization of small spaces, and also in that automatic production is interrupted by replacement of door holder jigs, resulting in a low production rate. Where a door is held at its outer surface by a door holder jig, the paint coating on the outer door surface may be damaged by the door holder jig, and the damaged door cannot be shipped as a product. Repainting the door may produce paint coating irregularities.

It has been customary to manually pull out a hinge pin for detaching a temporarily mounted door from an automobile body. Since the hinge pin is pulled out in a very limited space between the door and the body, however, the efficiency is bad and the rate of production is reduced.

SUMMARY OF THE INVENTION

It is a general object of the present invention to provide a method of and a mechanism for attaching and detaching an automobile door by supporting hinge pins on hinge members of the body with a hinge pin support mechanism capable of preventing the hinge pins, after being inserted, from dropping off or being removed, then bringing hinge members of the door into engagement with the hinge members of the door with a door assembling mechanism including door holder means and hinge pin presser means, inserting the hinge pins into the hinge members to couple the door to the body, and, after the body and the door have been painted, removing the hinge pins from the hinge members with hinge pin remover means while reliably holding the door with the door holder means.

Another object of the present invention is to provide a method of attaching a door to an automobile body, comprising the steps of temporarily holding a hinge pin on a first hinge member on the automobile body with a hinge pin support mechanism, holding the door to bring a second hinge member on the door into engagement with the first hinge member, and pressing the hinge pin into the second hinge member through the first hinge member to couple the door to the automobile door.

Still another object of the present invention is to provide a mechanism for attaching a door to an automobile body, comprising a hinge pin support mechanism for temporarily holding a hinge pin on a hinge member on the automobile body and for retaining the hinge pin against removal when the hinge pin has been inserted in the hinge member, holder means for displaceably holding the door, and presser means combined with the holder means for pressing the hinge pin into the hinge member on the automobile body.

Yet still another object of the present invention is to provide a mechanism for detaching a door which is attached to an automobile body with a hinge pin engaging a hinge member on the automobile body and a hinge member on the door, the mechanism comprising an arm displaceable with respect to at least the door, holder means for holding the door on the arm, positioning means for engaging the hinge member on the door to position the holder means, and remover means for removing the hinge pin from the hinge members.

A further object of the present invention is to provide a mechanism for coupling a first hinge member on an automobile body and a second hinge member on a door to mount the door on the automobile body, the mechanism comprising a ring member disposed on one of the first and second hinge members for guiding and receiving a pin which couples the first and second hinge members, the ring being of a hollow structure having a plurality of shear-off legs and a central hole, the arrangement being such that while the first and second hinge members are being aligned with each other, the pin is forcibly pressed into the central hole of the ring until a distal end of the pin projects out of the central hole, and the pin is further pressed into the first and second hinge members to shear the ring off the legs so that the ring can engage one of the first and second hinge members while retaining the hinge pin in the first and second hinge members against removal, whereby the first and second hinge members are coupled to each other.

A still further object of the present invention is to provide a hinge pin for coupling a first hinge member on an automobile body and a second hinge member on a door to mount the door for opening and closing on the automobile body, the hinge pin having a peripheral groove defined near a distal end thereof, the arrangement being such that when the hinge pin is inserted into the first and second hinge members which are aligned with each other, a ring mounted on one of the first and second hinge members is sheared off to fit into the peripheral groove.

The above and other objects, features and advantages of the present invention will become more apparent from the following description when taken in conjunction with the accompanying drawings in which a preferred embodiment of the present invention is shown by way of illustrative example.

DETAILED DESCRIPTION OF THE PREFERRED EMBODIMENT

Figure 1:
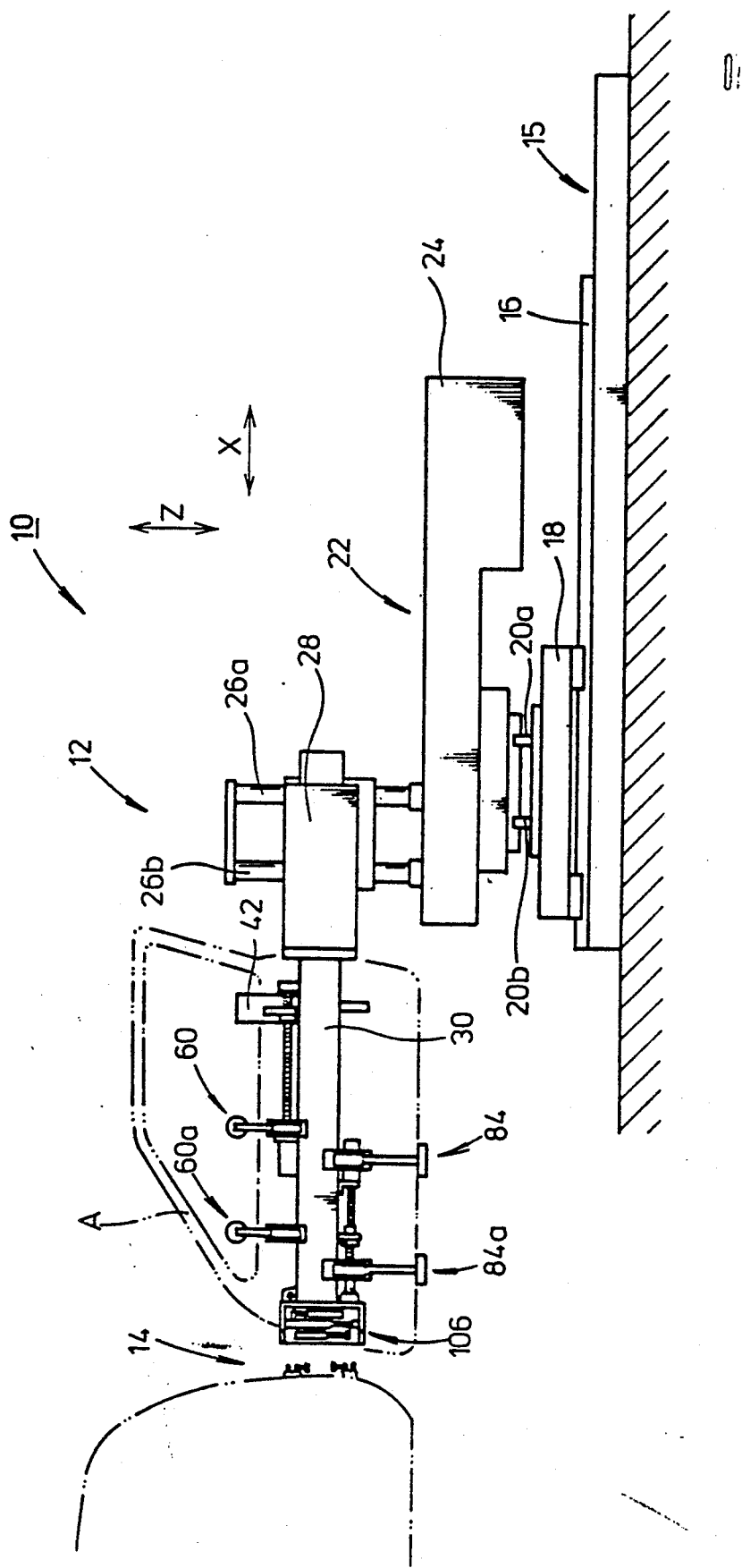
FIG. 1 is a fragementary front elevational view of a mechanism for attaching an automobile door according to the present invention.

FIG. 1 shows a mechanism for attaching an automobile door, the mechanism being generally designated by the reference numeral 10. The automobile door attaching mechanism 10 is essentially constructed of an assembling mechanism 12 and a hinge pin support mechanism 14. The assembling mechanism 12 includes carriage guide means 15 fixed to a floor. The carriage guide means 15 includes rails 16 on which there is movably disposed a carriage 18 movable in the direction of an X axis by wheels (not shown) which are rollingly movable on the rails 16. The carriage 18 supports on its upper surface a pair of rails 20a, 20b extending in a direction normal to the sheet of FIG. 1, the direction being referred to as a Y-axis direction. A main body 22 is disposed on the rails 20a, 20b so as to be movable in the Y-axis direction therealong. Thus, the main body 22 is movable in both the X- and Y-axis directions with respect to the floor. The main body 22 has a cover member 24 on one end thereof and a pair of guide posts 26a, 26b disposed vertically upwardly on the opposite end thereof. A lifter member 28 which is vertically movable in a Z-axis direction is supported on the guide posts 26a, 26b. The lifter member 28 supports one end of an arm 30 extending in the X-axis direction. Accordingly, the arm 30 is movable three-dimensionally in the X-, Y-, and Z-axis directions.

Figure 2:
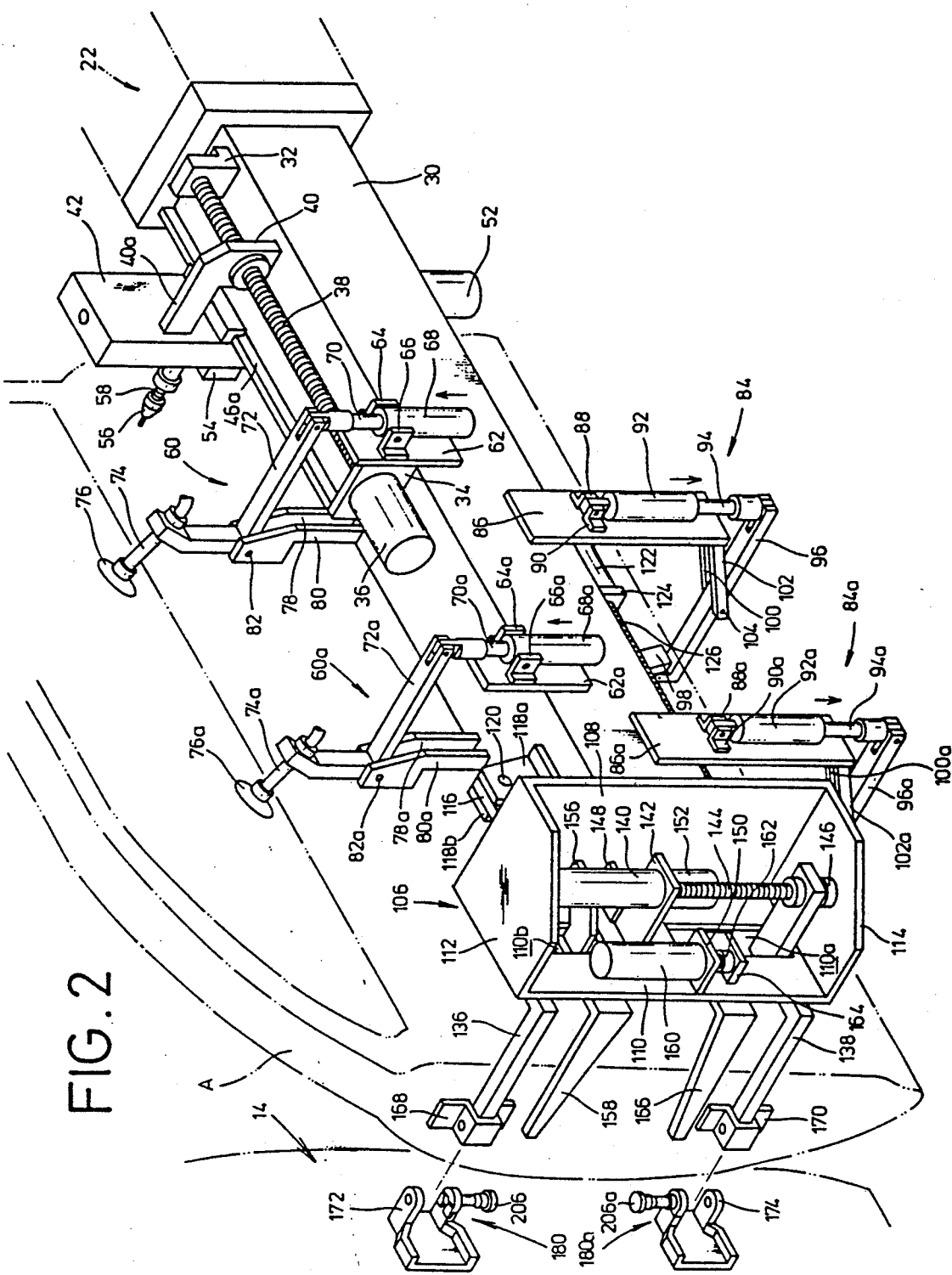
FIG. 2 is a perspective view of an arm of the automobile door attaching mechanism.
Figure 3:
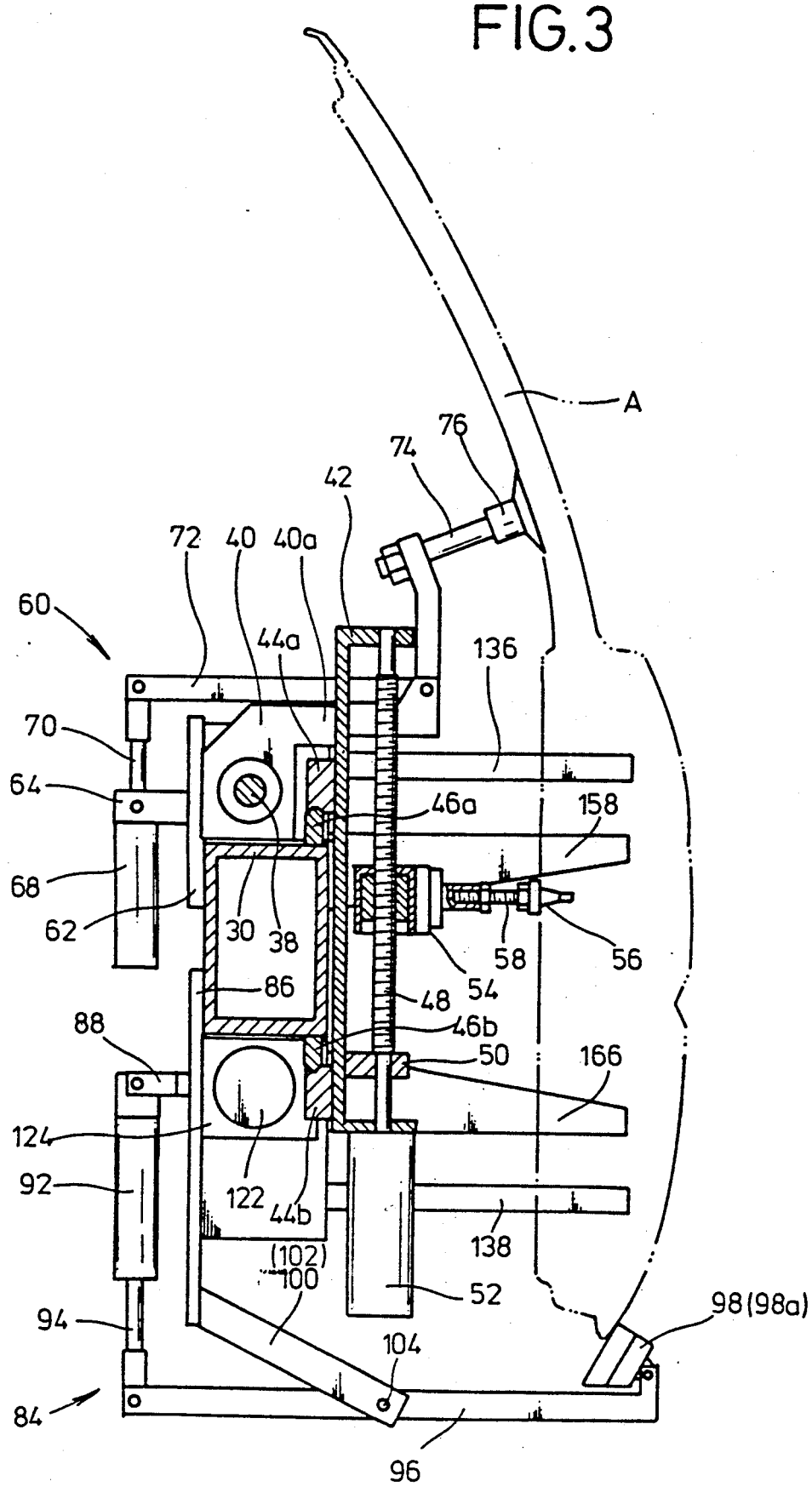
FIG. 3 is a side elevational view, partly in cross section, of the arm of the automobile door attaching mechanism.
Figure 4:
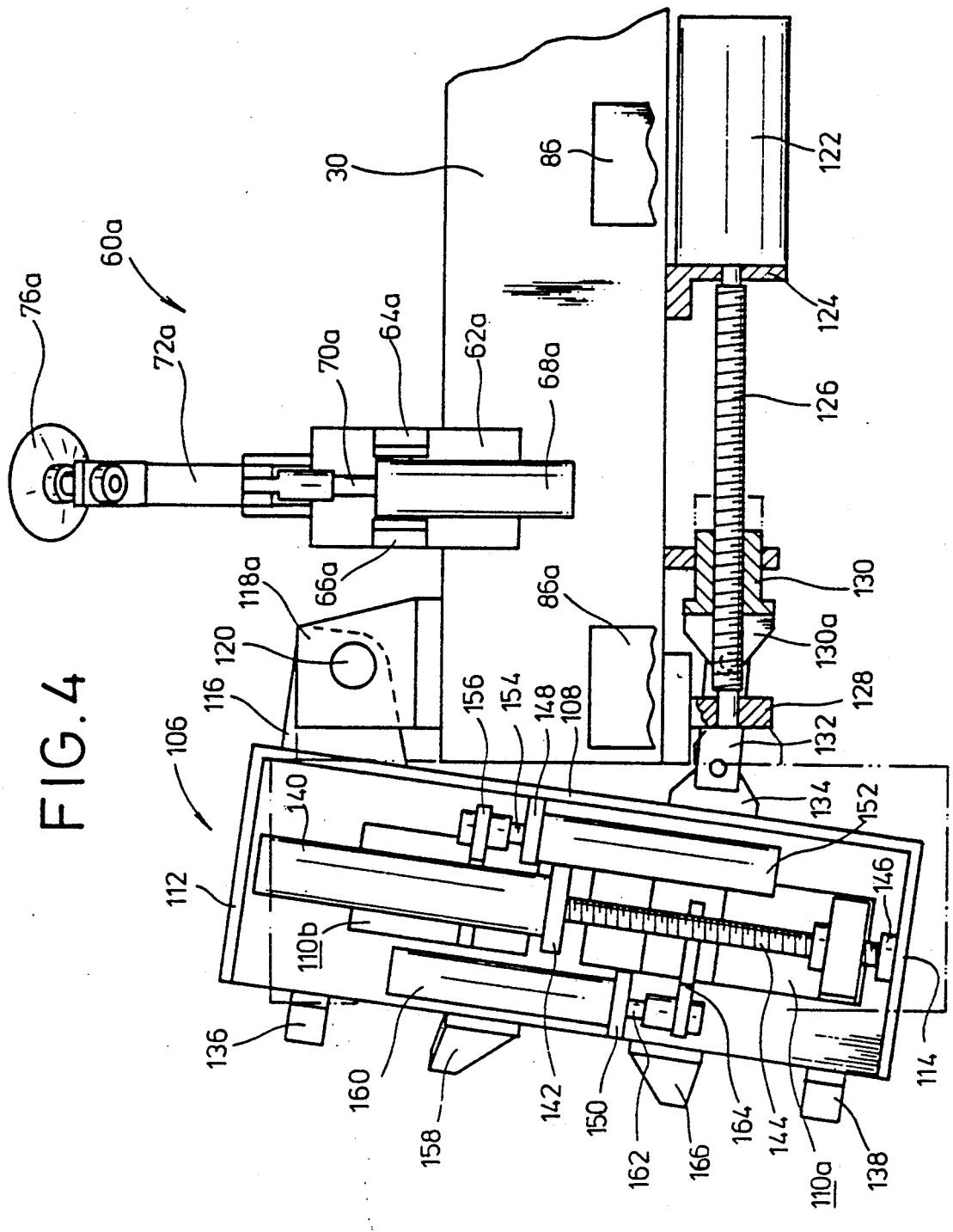
FIG. 4 is a fragmentary front elevational view of a distal end of the arm of the automobile door attaching mechanism.

Means for holding a door A shown by the two-dot-and-dash lines in FIG. 1 is mounted on the arm 30. FIGS. 2 through 4 illustrate such door holding means in detail.

The arm 30 supports on its upper surface a bearing member 32 and a motor attachment plate 34 which are spaced from each other by a prescribed distance along the arm 30. A motor 36 is attached to one end surface of the motor attachment plate 34 and has a rotatable drive shaft coupled to one end of a first ball screw 38 extending through a hole (not shown) defined in the motor attachment plate 34. The other end of the first ball screw 38 is rotatably supported by the bearing member 32. A plate 40 of a bent configuration is threaded on the first ball screw 38, the plate 40 having a bent distal end 40a extending toward one side of the arm 30 where the door is to be held. The distal end 40a of the plate 40 is joined to a slide member 42. Projecting on one surface of the slide member 42, are engagement members 44a, 44b having respective recesses and engaging respective guides 46a, 46b disposed respectively on the upper and lower surfaces of the arm 30 and extending substantially parallel to the first ball screw 38.

As better shown in FIG. 3, the slide member 42 is of a substantially channel-shaped cross section having upper and lower ends projecting toward the door A and between which a second ball screw 48 is rotatably supported. The second ball screw 48 is also rotatably supported near one end thereof by a support post 50 projecting from the slide member 42, and has one end coupled to the rotatable drive shaft of a motor 52 which rotates the second ball screw 48 about its own axis. An engaging pin support member 54 is vertically movably threaded on the second ball screw 48 and supports an engaging pin 56 directed toward the door A for engaging the striker of the door A. The engaging pin 56 is movable toward and away from the striker by means of a screw 58.

A pair of first holder means 60, 60a is mounted on an intermediate portion of the arm 30 for holding the door A through the engaging pin 56 and a pair of upper and lower fingers (described later). One of the first holder means 60 includes a drive source attachment plate 62 joined to one side of the arm 30 and a pair of angles 64, 66 attached to the drive source attachment plate 62, the angles 64, 66 sandwiching a cylinder 68. The cylinder 68 has a piston rod 70 projecting upwardly from one end thereof, and a connector 72 is pivotally coupled to the distal end of the piston rod 70. The connector 72 is disposed above the arm 30 and extends transversely from one side to the other of the arm 30, and has a portion bent upwardly substantially at a right angle. The bent portion of the connector 72 has a hole (not shown) in which a rod 74 is fitted. A suction disc or cup 76 is mounted on the distal end of the rod 74, the suction disc 76 being coupled to a vacuum source. The bent portion of the connector 72 is angularly movable supported by a pin 82 extending between a pair of upstanding support legs 78, 80 mounted on the upper surface of the arm 30.

The other first holder means 60a is spaced from the first holder means 60 and located near the distal end of the arm 30. The holder means 60a is of a construction substantially identical to that of the holder means 60, and various identical components of the holder means 60a are designated by identical reference numerals with a suffix a and will not be described in detail. One of the holder means 60, 60a may be dispensed with.

A pair of second holder means 84, 84a is mounted on the arm 30 and directed downwardly, the second holder means 84 being disposed between the first holder means 60, 60a. The second holder means 84 includes a drive source attachment plate 86 joined to one side of the arm 30 and a pair of angles 88, 90 attached to the drive source attachment plate 86, the angles 88, 90 sandwiching a cylinder 92. The cylinder 92 has a piston rod 94 projecting downwardly from one end thereof, and a connector 96 is pivotally coupled to the distal end of the piston rod 94. The connector 96 is disposed below the arm 30 and extends transversely from one side to the other of the arm 30 toward the door A, and has a distal end bent upwardly substantially at a right angle. A clamp 98 of synthetic resin is swingably mounted on the bent distal end of the connector 96. The connector 96 is swingably supported at its central portion by a pin 104 extending between support arms 100, 102 projecting obliquely downwardly from the drive source attachment plate 86.

The other second holder means 84a is mounted on the arm 30 near its distal end. Since the holder means 84a is of a construction substantially identical to that of the holder means 84, it will not be described in detail with various identical components of the holder means 84a being designated by identical reference numerals with a suffix a.

A casing 106 is mounted on the distal end of the arm 30. As can readily be seen from FIG. 2, the casing 106 includes a first side plate 108, a second side plate 110, a top plate 112, and a bottom plate 114. A connector 116 extends from an upper portion of the first side plate 108 toward the main body 22 and is sandwiched between a pair of casing support members 118a, 118b mounted on the upper surface of the arm 30, the connector 116 being rotatably supported by a pin 120 extending betwen the casing support members 118a, 118b. Thus, the casing 106 is supported on the arm 30 for vertical swingable movement about the pin 120.

A motor 122 (FIG. 4) is mounted on the lower surface of the arm 30 by means of a motor attachment angle 124 for angularly moving the casing 106. More specifically, the rotatable drive shaft of the motor 122 is coupled to one end of a ball screw 126 supported on the arm 30 and extending toward the distal end of the arm 30 parallel thereto. The other end of the ball screw 126 is rotatably supported by a bearing member 128 on the arm 30. A pusher 130 is threaded on the ball screw 126 and has an end 130a joined by a rod 132 to a connector 134 fixed to a lower portion of the first side plate 108 of the casing 106.

As shown in FIG. 2, a first finger 136 fixed to an upper portion of the second side plate 110 is directed toward and terminates at the door A, and a second finger 138 is disposed near the lower end of the second side plate 110, the second finger 138 being movable in the Z-axis direction as described below. A motor 140 for driving the second finger 138 is secured to a motor holder plate 142 projecting from the second side plate 110 into the casing 106. The motor 140 has its rotatable drive shaft directed downwardly and coupled to one end of a ball screw 144, the other end of which is rotatably supported by a bearing member 146 mounted on the bottom plate 114. The second finger 138 has one end threaded on the ball screw 144.

The second finger 138 is of a bent shape and projects out of the casing 106 through a hole 110a defined in the second side plate 110, the second finger 138 extending toward and terminating at the door A. The first and second fingers 136, 138 are located in a symmetrical fashion with respect to a central horizontal line normal to the second side plate 110. Holder plates 148, 150 project from the second side plate 110 into the casing 106, the holder plates 148, 150 being staggered vertically with respect to each other. A pusher cylinder 152 is supported on the lower surface of the holder plate 148 and has a piston rod 154 (FIG. 4) movably projecting upwardly and having a distal end coupled to a plate 156. The plate 156 is integrally joined to a first presser 158 for pressing a hinge pin (described later) to couple the door A to an automobile body. The plate 156 extends toward the door A through a hole 110b defined in the second side plate 110. The first presser 158 is positioned downwardly of the first finger 136 and extends toward the door A substantially parallel to the first finger 136.

Another pusher cylinder 152 is supported on the upper surface of the holder plate 150 and has a piston rod 152 projecting downwardly and coupled to one end of a plate 164. The other end of the plate 164 projects out through a hole 110a defined in the second side plate 110 and integrally joined to a second presser 166. The second presser 166 is disposed above the second finger 138 and positioned in symmetrical relation to the first presser 158 with respect to the central horizontal line normal to the second side plate 110. The first and second fingers 136, 138 have their distal ends fitted respectively in a pair of channel-shaped hinge members 168, 170 on the door A. When the door A is coupled to the automobile body, the first and second fingers 136, 138 are brought into engagement with a pair of hinge members 172, 174, respectively, on the automobile body. At this time, the hinge pin support mechanism 14, as described above, is mounted on the hinge members 172, 174 on the automobile body.

The hinge pin support mechanism 14 will now be described with reference to FIGS. 5 through 7.

Figure 5:
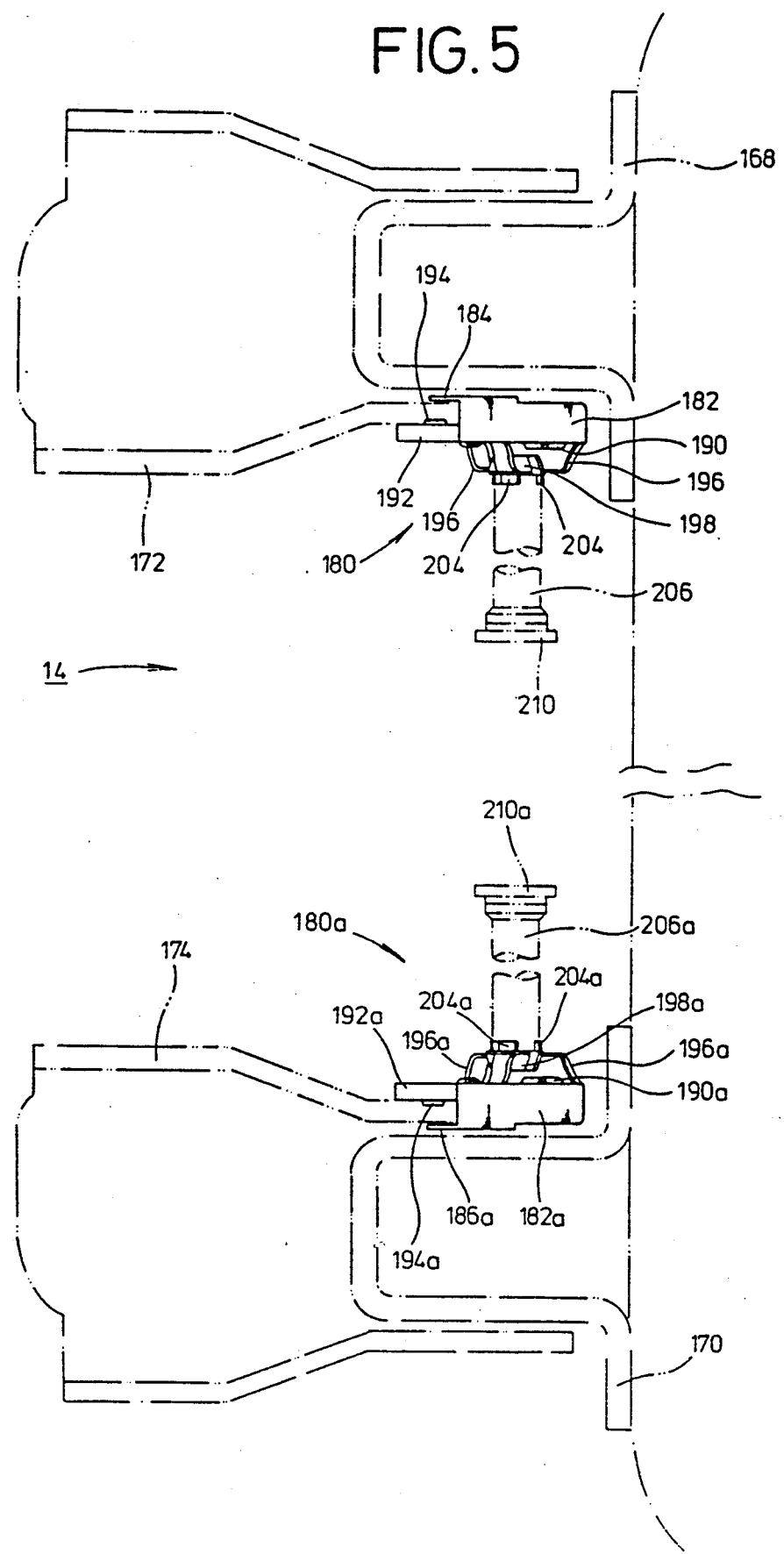
FIG. 5 is a front elevational view of a hinge pin support mechanism of the automobile door attaching mechanism.
Figure 6:
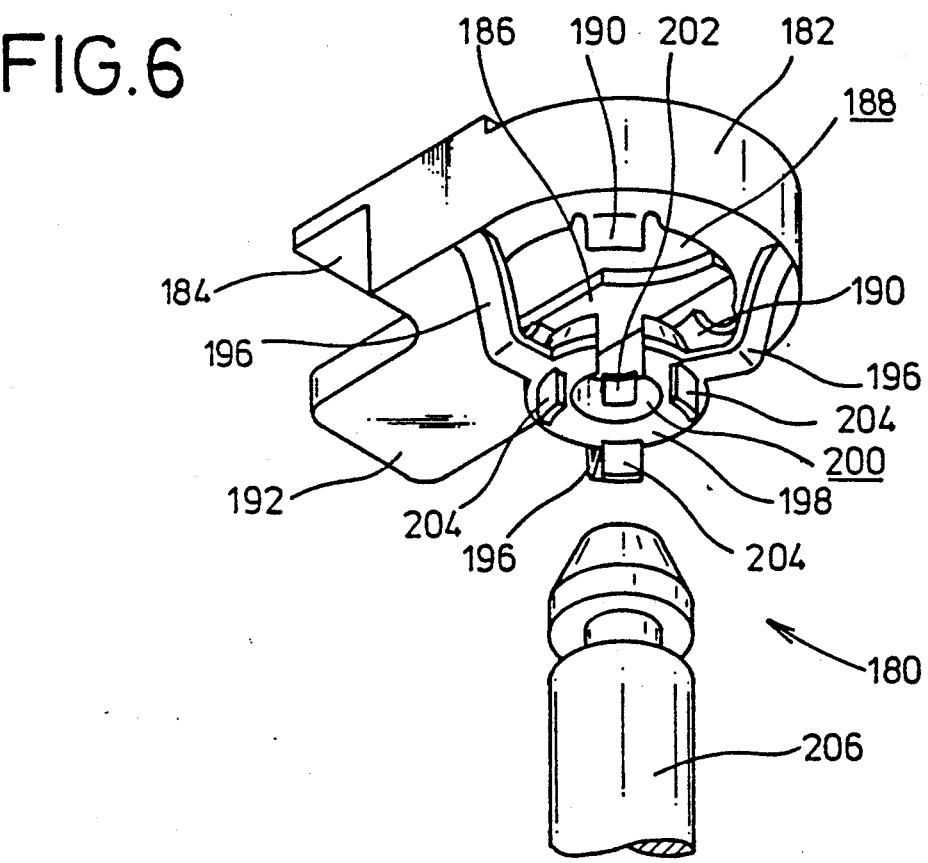
FIG. 6 is a perspective view of a hinge pin support member of the automobile door attaching mechanism.
Figure 7:
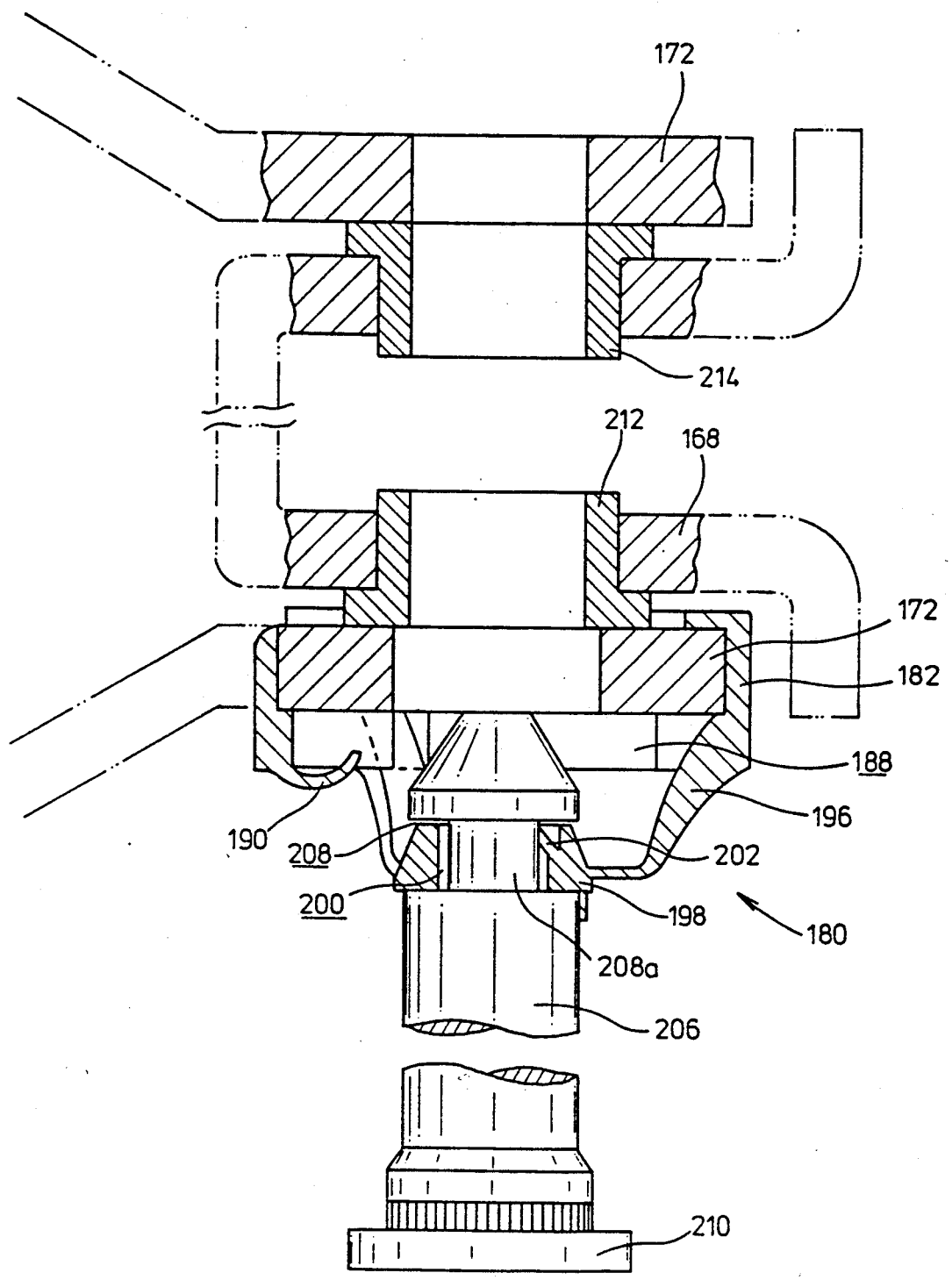
FIG. 7 is an enlarged fragmentary cross-sectional view of the hinge pin support mechanism.

As shown in FIGS. 5 through 7, the hinge pin support mechanism 14 includes hinge pin support members 180, 180a each integrally molded as one piece of a synthetic resin material. The hinge pin support member 180 has a body 182 engageable with the distal end of one side of the hinge member 172 on the automobile body. More specifically, the body 182 has a hollow defined therein for receiving the distal end of the hinge member 172, and includes projections 184, 186 on an upper portion thereof which are directed into the hollow, as shown in FIG. 6. The body 182 has a hole 188 defined in one side thereof and communicating with the hollow, and a plurality of teeth 190 projecting into the hole 188 for preventing a hinge pin from dropping off when the hinge pin has been inserted a certain length into the hole 188. As shown in FIG. 5, a protuberance 192 is formed on an upper surface of the body 182 and extends to the left, the protuberance 192 having an engagement member 194 engageable with the hinge member 172 for positioning purpose.

A plurality of legs 196 project from one surface of the body 182 and integrally support a taper ring 198. As shown in FIGS. 6 and 7, the taper ring 198 is of a frustoconical shape having a lower portion of greater diameter and an upper portion of smaller diameter, the taper ring 198 having an axial hole 200. The taper ring 198 also has a radial recess defined in a peripheral wall thereof and a plurality of circumferentially spaced flexible tongues 202 projecting obliquely into the hole 200. A plurality of circumferentially spaced projections 204 are formed on the end face of the larger-diameter portion of the taper ring 198 for engaging an outer surface of the hinge pin.

The hinge pin, denoted at 206, is supported by the hinge pin support member 180. As illustrated in FIG. 7, the hinge pin 206 has a peripheral groove 208 of prescribed width defined near one end thereof, which is shaped as a frustoconical configuration. The hinge pin 206 also has a flange 210 on the other end thereof. The taper ring 198 of the hinge pin support member 180 engages in the peripheral groove 208 of the hinge pin 206. The diameter of the hole 200 of the taper ring 198 is substantially larger than the diameter of a peripheral surface 208a which defines the peripheral groove 208 therearound. Since the tongues 202 are held against the peripheral surface 208a, the taper ring 202 is further contractable radially inwardly under radially inward forces applied. The projections 204 held against the outer surface of the hinge pin 206 serve to center the hinge pin 206.

The hinge pin 206 is thus supported by the hinge support member 180, which engages the hinge member 172 on the automobile body for positioning the hinge pin 206. Bush-shaped guides 212, 214 (FIG. 7) fitted in the door hinge member 268 serve to guide the hinge pin 206 with the inner wall surfaces of the guides 212, 214 when the hinge pin 206 is inserted.

The other hinge pin support member 180a is identical in shape to the hinge pin support member 180, and engages the hinge member 174 on the automobile body in the same manner. Identical components of the hinge pin support member 180a are denoted by identical reference numerals with a suffix a and will not be described in detail.

Operation and advantages of the mechanism for mounting the automobile door and the hinge pins thus constructed above will be described below.

As shown in FIG. 7, the hinge pins 206, 206a are engaged by the hinge pin support members 180, 180a, respectively, and the ends of the hinge members 172, 174 on the automobile body are brought into the hollows of the bodies 182, 182a of the hinge pin support members 180, 180a. The hinge pins 206, 206a are thus temporarily supported while being axially directed toward holes defined in the hinge members 172, 174.

The main body 22 is then moved to position the arm 30 inwardly of the door A to be installed on the automobile body and parallel to the door A. The main body 22 and the arm 30 are stopped at a position in which the first finger 136 on the distal end of the arm 30 can fit into the upper channel-shaped hinge member 168 on the door A merely through movement in the Y-axis direction.

Then, the motors 122, 140 are energized to position the second finger 138 so that it can fit into the lower channel-shaped hinge member 170 on the door A merely through movement in the Y-axis direction. The motors 36, 52 are thereafter energized to move the engaging pin 56 so that it can engage the striker of the door A merely through movement in the Y-axis direction. Then, the arm 30 is moved toward the door A in the Y-axis direction to bring the first finger 136, the second finger 138, and the engaging pin 56 into engagement respectively with the hinge members 168, 170 and the striker of the door A. The cylinders 68, 68a of the first holder means 60, 60a are actuated in the direction of the arrows in FIG. 2. The connectors 72, 72a are now swung about the respective pins 82, 82b by the piston rods 70, 70a of the cylinders 68, 68a for thereby moving the suction discs 76, 76a into contact with the window glass sheet of the door A to attract the same under suction.

The cylinders 92, 92a of the second holder means 84, 84a are operated in the direction of the arrows to cause the piston rods 94, 94a to turn the connectors 96, 96a about the pins 104, 104a, respectively. The clamps 98, 98a on the distal ends of the connectors 96, 96a are angularly moved to hold the lower edge of the door A.

The door A which has been rigged is now held by the arm 30 of the door attaching mechanism 12.

The main body 22 is moved to align the hinge members 168, 170 on the door A with the hinge members 172, 174, respectively, on the automobile body, as shown in FIG. 7. The hinge pins 206, 206a temporarily supported on the respective hinge members 172, 174 on the automobile body are then forced into the hinge members. More specifically, the cylinder 152 is actuated to elevate the piston rod 154 to enable the plate 156 to lift the first presser 158 so that its distal end forces the hinge pin 206 upwardly into the hinge members 172, 168. At the same time, the cylinder 160 is actuated to lower the piston rod 162 to enable the plate 164 to lower the second presser 166 so that its distal end forces the hinge pin 206a downwardly into the hinge members 174, 170. The door A is now coupled to the automobile body.

Figure 8:
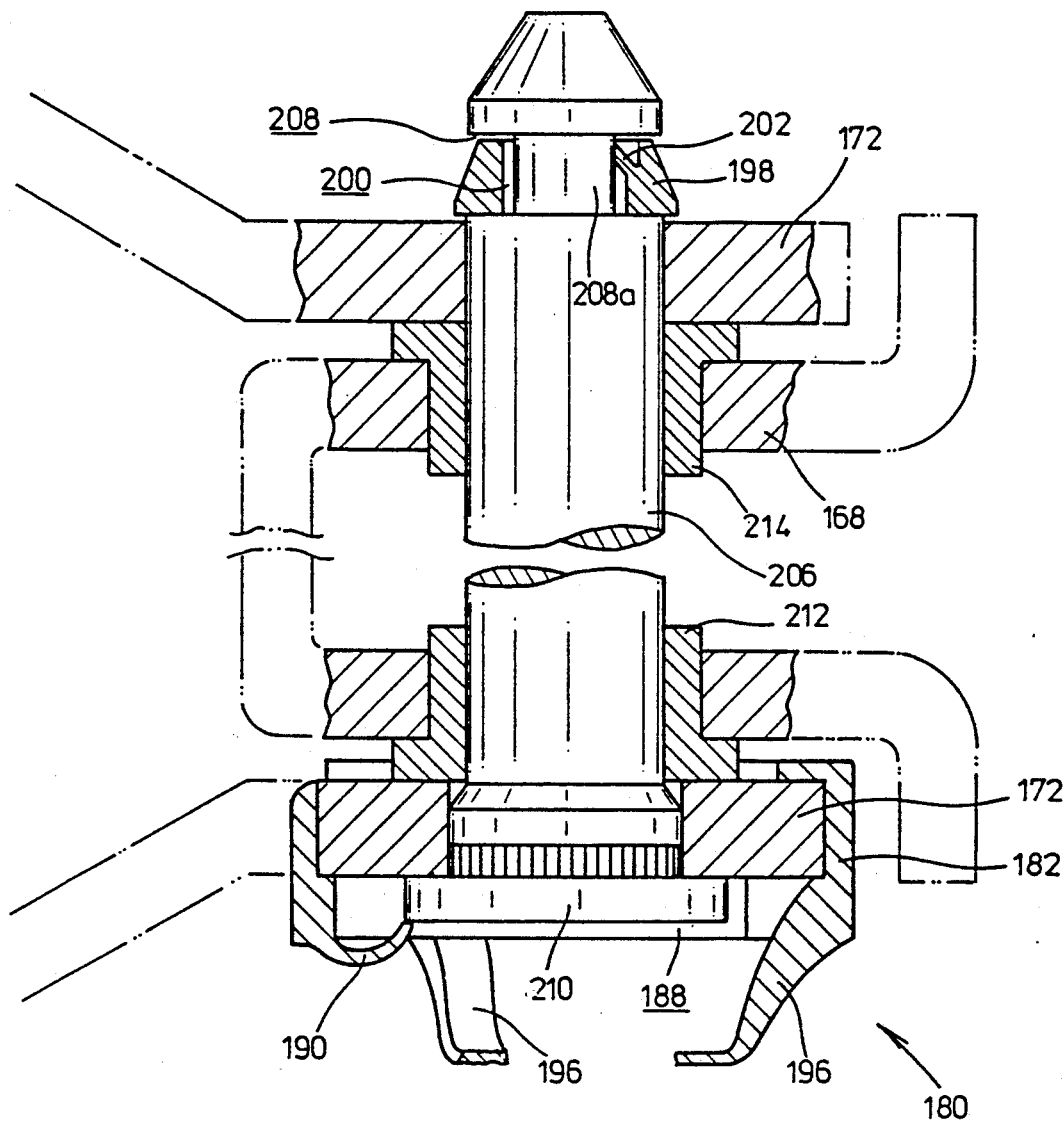
FIG. 8 is an enlarged fragmentary cross-sectional view of the hinge pin support mechanism with a hinge pin inserted.

As can easily be seen from FIG. 8, the taper ring 198 and the legs 196 are sheared off from each other upon insertion of the hinge pin 206, with the taper ring 198 in the peripheral groove 208 being carried away by the hinge pin 106. More specifically, during an initial period of insertion of the hinge pin 206, the legs 196 are elastically deformed by being pulled by the taper ring 198. When the hinge pin 206 is further displaced until its distal end fits into the guide member 212 held in the door hinge member 168, the taper ring 198 is contracted radially inwardly while pushing the tongues 202 under radially inward forces applied by the guide 212 and is sheared off from the legs 196 on the lower edge of the inner peripheral wall surface of the guide member 212 as the taper ring 198 is forced into the guide member 212. Upon radially inward contraction of the taper ring 198, the projections 204 are also sheared off on a shoulder of the hinge pin 206 below the peripheral groove 208. The hinge pin 206 is smoothly moved on while being guided by the guide member 212, and the distal end of the hinge pin 206 passes through the guide member 214 until it reaches the other side of the hinge member 172 on the automobile body. After the hinge pin 206 has been inserted a prescribed interval, the taper ring 198 emerges out of the hinge member 172 and elastically restores its original shape as shown in FIG. 8 whereupon the larger-diameter portion of the taper ring 198 becomes larger than the hole of the hinge member 172. Consequently, the end surface of the larger-diameter portion of the taper ring 198 engages the end surface of the hinge member 172, thus preventing the hinge pin 206 from dropping off. The flange 210 of the hinge pin 206 is also engaged by the teeth 190 on the body 182 of the hinge pin support member 180 to ensure that the hinge pin 206 will not drop off or be removed accidentally from the hinge members.

The hinge pin 206a is inserted into position in the same manner as described above with respect to the hinge pin 206.

As described above, simply by supporting the hinge pins 206, 206a on one side of the hinge members 172, 174 on the automobile body with the hinge pin support mechanism 14 and forcing the hinge pins 206, 206a into the hinge members 172, 168 and the hinge members 174, 170, the inserted hinge pins 206, 206a are protected from accidental removal due for example to vibration after the door A has been coupled to the automobile body, the hinge pins 206, 206a being retained in place by the taper rings 198, 198a engaging in the peripheral grooves 208, 208a of the hinge pins 206, 206a and also by the teeth 190, 190a on the bodies 182, 182a of the hinge pin support members 180, 180a. Since each of the hinge pin support members 180, 180a is integrally molded of synthetic resin, they can be manufactured less costly than would be if they were made of a metallic material. The guide members 212, 214 and 212a, 214a held in the hinge members 168, 170 on the door A allow the hinge pins 206, 206a to be smoothly inserted into the hinge members 168, 172 and 170, 174 without the danger of being tilted or displaced.

Thereafter, the cylinders 68, 68a, 92, 92a of the holder means 60, 60a, 84, 84a are operated in the opposite directions to release the holder means 60, 60a, 84, 84a from the door A, and the arm 30 is moved away from the door A. The main body 22 is moved back to its original position in readiness for mounting another door.

When a door of a different shape is to be installed on an automobile body of a different type, the second finger 138 for fitting into the lower hinge member 170 on the door A is vertically moved by the motor 140 toward or away from the first finger 136 to fit into the upper hinge member 168 on the door A. The motor 122 is also energized to swing the casing 106 for directing the second finger 138 into alignment with the lower hinge member 168. The slide member 42 is moved laterally in FIG. 2 by the motor 36 on the arm 30, and the motor 52 mounted on one end of the slide member 42 is energized to move the engaging pin support member 54 vertically in FIG. 3. The engaging pin 56 is thus moved in a substantially vertical plane until it is aligned with the striker of the door A. As a consequence, various doors of different shapes to be installed on different automobile types can easily be held simply by moving the second finger 138 and the engaging pin 56 relatively to the doors.

The suction discs 76, 76a of the first holder means 60, 60a are adhered under vacuum to the window glass sheet of the door A. Since the window glass sheet remains substantially in the same position even on different door shapes, the suction discs 76, 76a can be used on various doors of different shapes. The clamps 98, 98a of the second holder means 84, 84a are automatically adjustable to appropriately engage the lower edge of the door A irrespective of the shape of the door A. Therefore, the second holder means 84, 84a are not required to move independently, and their structure is much simpler than those of the conventional mechanism.

The door A which has been temporarily installed on the automobile body by the hinge pins can be detached by a door detaching mechanism as shown in FIGS. 9 through 12. The door detaching mechanism is basically similar to the door attaching mechanism. Therefore, those parts of the door detaching mechanism which are identical to those of the door attaching mechanism are denoted by identical reference numerals, and will not be described in detail.

The door detaching mechanism has connectors which are different in shape from the connectors 72, 72a of the door attaching mechanism, and also has fingers and pressers which are different in shape from the first and second fingers 136, 138 and the first and second pressers 158, 166 of the door attaching mechanism.

Figure 9:
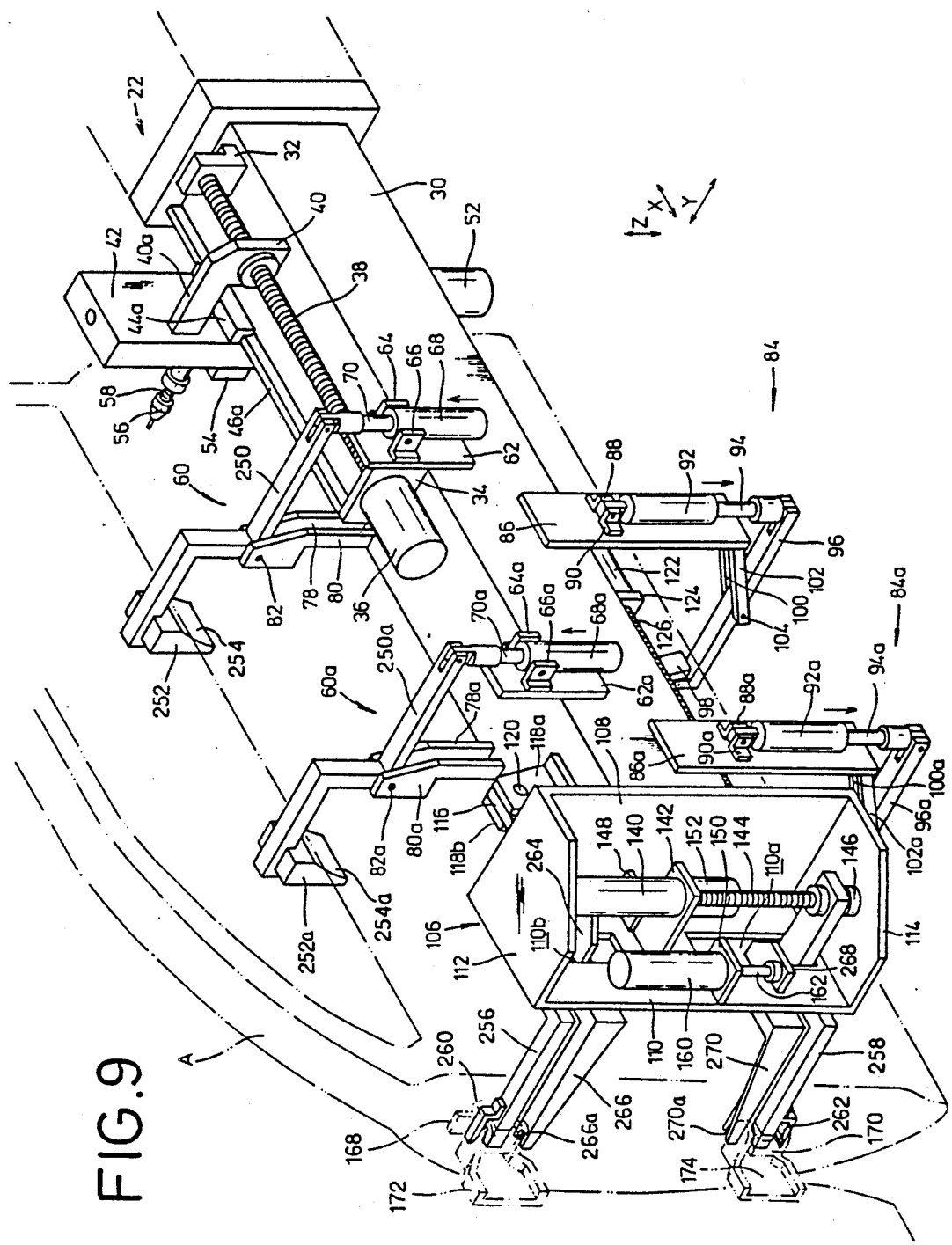
FIG. 9 is a perspective view of a mechanism for detaching an automobile door according to the present invention.

As shown in FIG. 9, the first holder means 60 includes a connector 250 disposed above the arm 30 and extending from one side to the other of the arm 30 toward the door A. The connector 250 includes a bent portion which is directed upwardly and then horizontally toward the door A. A clamp 252 made of a synthetic resin material is mounted on the distal end of the bent portion of the connector 250. The clamp 252 has a curved surface 254 directed downwardly which will be held against the outer wall of the door A to hold the door A.

The other first holder means 60 is spaced from the first holder means 60a and positioned near the distal end of the arm 30. The holder means 60 also has a connector 250a identical to the connector 250 and a clamp 252a identical to the clamp 252. Either one of the holder means 60, 60a may be dispensed with as desired.

Figure 10:
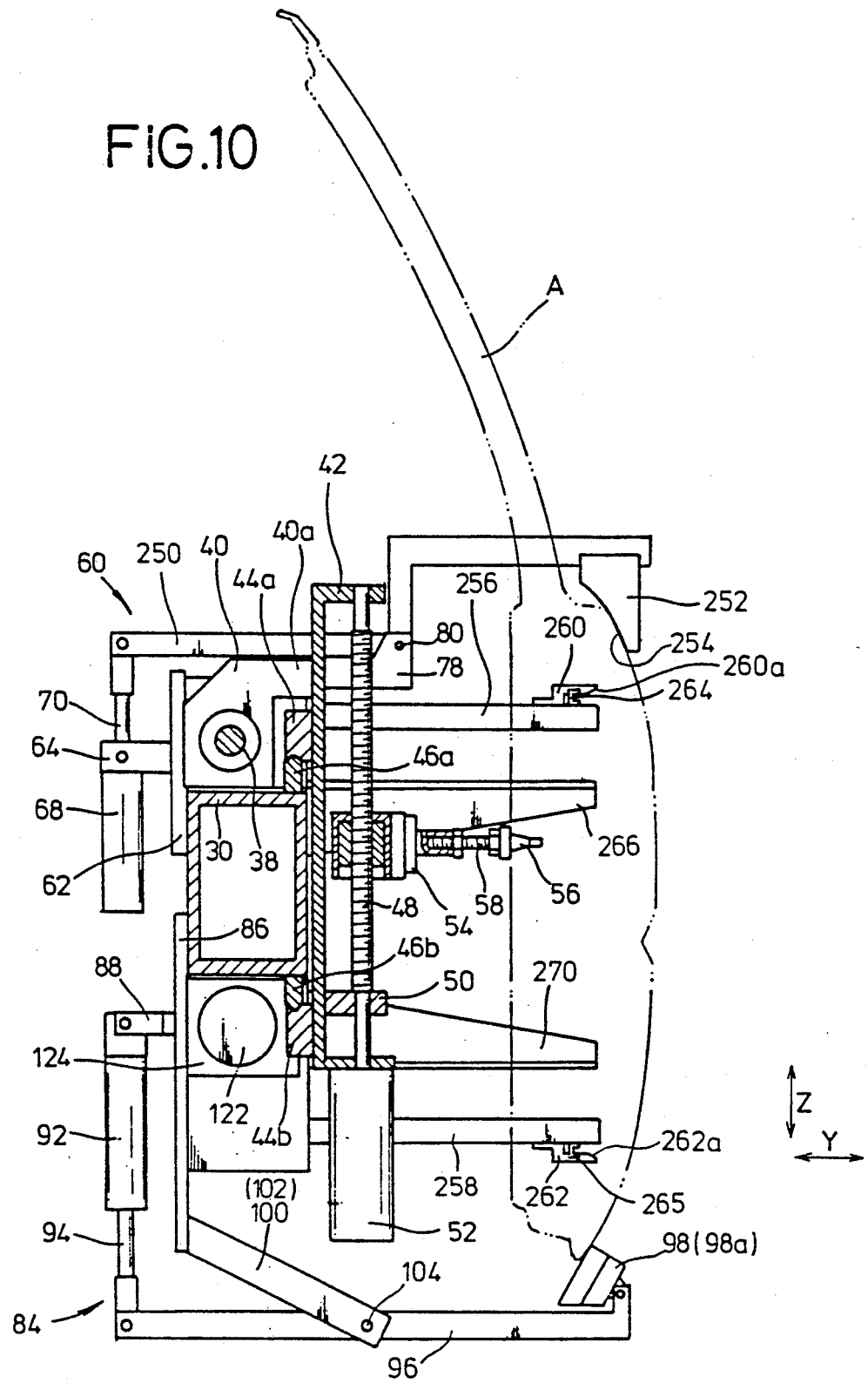
FIG. 10 is a side elevational view, partly in cross section, of an arm of the automobile door detaching mechanism.
Figure 11:
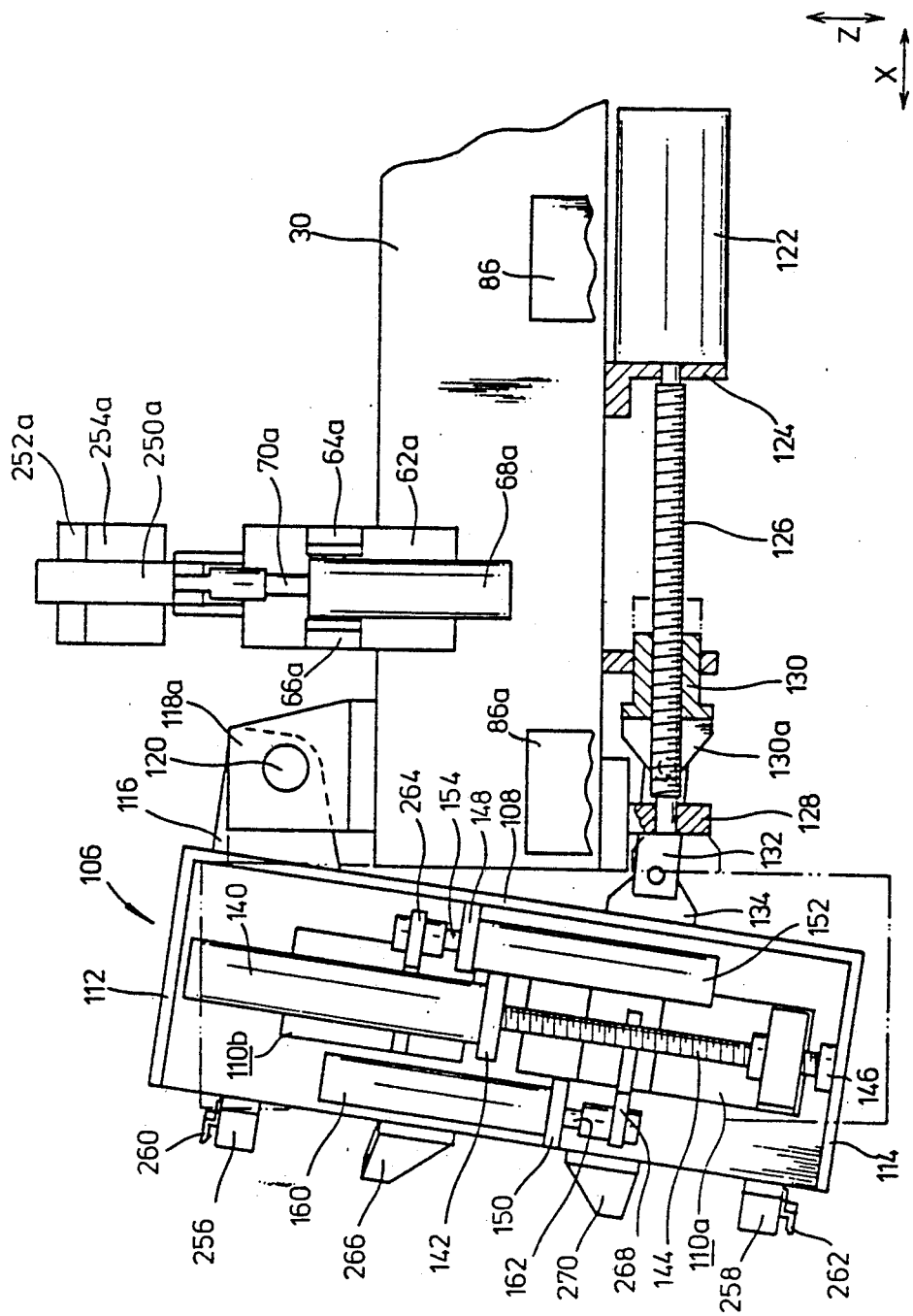
FIG. 11 is a fragmentary front elevational view of a distal end of the arm of the automobile door detaching mechanism.
Figure 12:
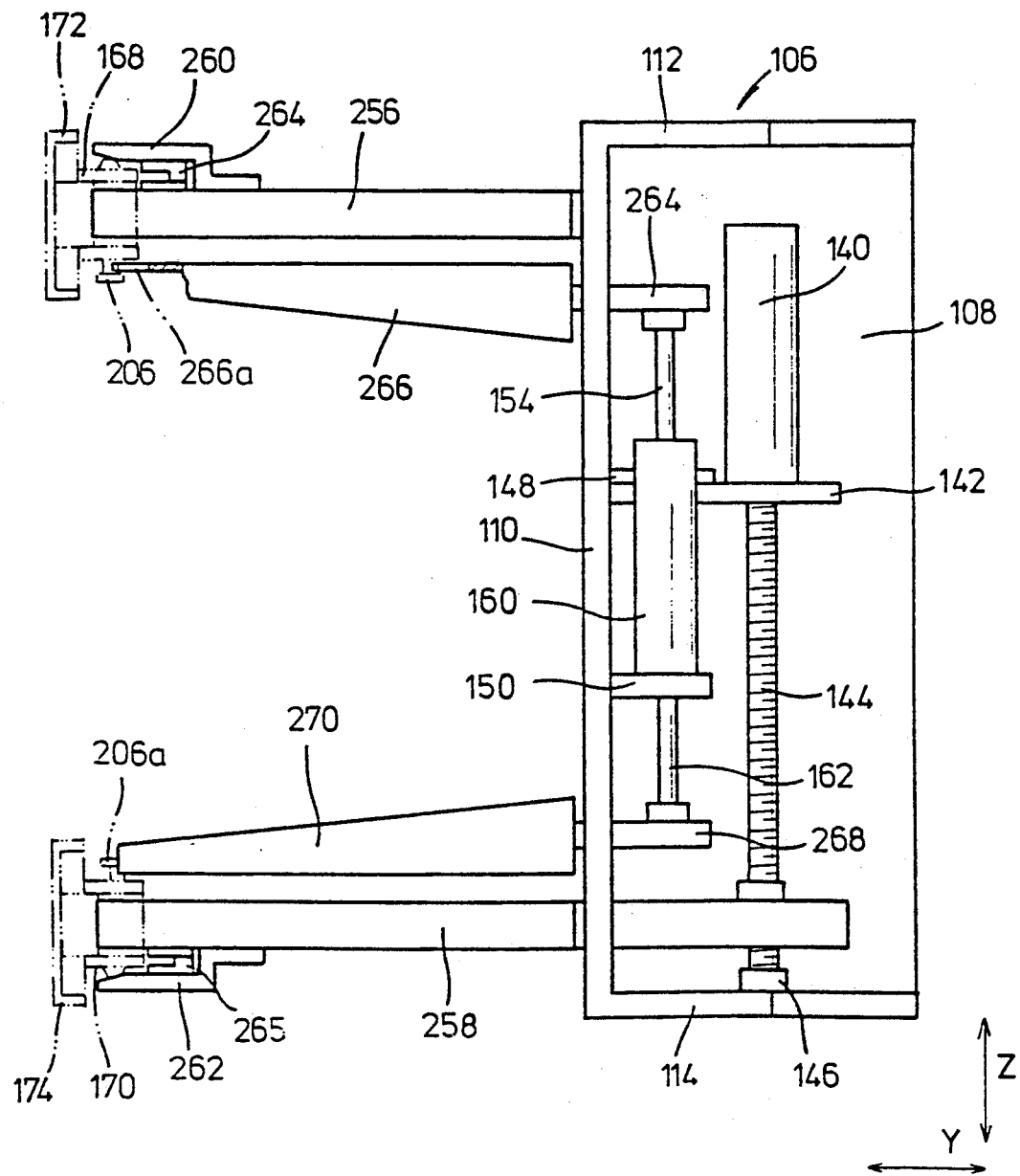
FIG. 12 is a side elevational view of a portion of the automobile door detaching mechanism.

The door detaching mechanism also includes a third finger 256 mounted as positioning means on an upper portion of the outer surface of the second side plate 110, the third finger 256 extending toward and terminating at the door A, and a fourth finger 258 disposed near a lower portion of the second side plate 110 and movable in the Z-axis direction. The third and fourth fingers 256, 258 support thereon pressers 260, 262, respectively, and stoppers 264, 265, respectively, as shown in FIG. 10. The pressers 260, 262 have distal ends spaced slightly from the fingers 256, 258, respectively, and extending substantially parallel thereto, the distal ends having respective tapered surfaces 260a, 262a. The tapered surfaces 260a, 262a of the pressers 260, 262 serve to press the hinge pins when the third and fourth fingers 256, 258 are fitted into the hinge members on the door A (see FIG. 12).

As illustrated in FIG. 9, the fourth finger 258 has an end threaded on the ball screw 144 and projects out through the hole 110a defined in the second side plate 110. The fourth finger 258 is of a bent configuration extending toward and terminating at the door A. The fourth finger 258 is shaped in symmetrical relation to the third finger 256 with respect to the horizontal central line normal to the second side plate 110. A plate 264 is mounted on the distal end of the piston rod 154 movably projecting from the cylinder 152. The plate 264 is integrally joined to a first pulling member 266 for pulling out the hinge pin which connects the door A to the automobile body. The plate 264 extends toward the door A through the hole 110b defined in the second side plate 110. The first pulling member 266 is disposed below the third finger 256 and extends toward the door A substantially parallel to the third finger 256.

A plate 268 is mounted at one end on the distal end of the piston rod 162 extending from the cylinder 160. The plate 268 projects through the hole 110a of the second side plate 110 and has its other end integrally joined to a second pulling member 270. The second pulling member 270 is disposed upwardly of the fourth finger 258 in symmetrical relation to the first pulling member 266 with respect to the horizontal central line normal to the second side plate 110. The first and second pulling members 266, 270 have substantially U-shaped cavities or recesses 266a, 270a, respectively, defined in their distal ends. When the distal ends of the third and fourth fingers 256, 258 are fitted respectively into the channel-shaped hinge members 168, 170 on the door A, the pressers 260, 262 press the respective hinge pins 206, 206a downwardly, whereupon the distal ends of the first and second pulling members 266, 270 are inserted into the gaps between the flanges of the hinge pins 206, 206a and the hinge members 172, 174 on the automobile body, the hinge pins 206, 206a being partly fitted in the cavities 266a, 270a, respectively, (see FIG. 12).

The door detaching mechanism of the above structure operates as follows:

The main body 22 is moved so that the arm 30 is positioned inwardly of the door A and extends parallel to the door A. The main body 22 and the arm 30 are stopped at a position in which the third finger 256 on the distal end of the arm 30 can fit into the upper channel-shaped hinge member 168 on the door A simply through movement in the Y-axis direction.

Then, the motors 122, 140 are energized to position the fourth finger 258 so that the fourth finger 258 can fit into the lower channel-shaped hinge member 170 on the door A simply through movement in the Y-axis direction. The motors 36, 52 are then energized to move the engaging pin 56 to a position in which it can engage the striker of the door A merely upon movement in the Y-axis direction. Now, the arm 30 is moved toward the door A in the Y-axis direction to cause the third finger 256, the fourth finger 258, and the engaging pin 56 to engage the hinge members 168, 170 and the striker, respectively, of the door A. When the third and fourth fingers 256, 258 are fitted into the hinge members 168, 170 to a prescribed degree, the pressers 260, 262 on the third and fourth fingers 256, 258 engage and press the hinge pins 206, 206a in a direction out of the hinge members. More specifically, upon movement of the arm 30 in the Y-axis direction, the tapered surfaces 260a, 262a of the pressers 260, 262 push the distal ends of the hinge pins 206, 206a thereby to displace the flanges 210, 210a of the hinge pins 206, 206a away from the hinge members 172, 174, producing gaps therebetween. Continued movement of the arm 30 in the Y-axis direction causes the third and fourth fingers 256, 258 to fit into the respective hinge members 168, 170 until the stoppers 264, 265 on the third and fourth fingers 256, 258 abut against the respective hinge members 168, 170. The distal ends of the first and second pulling members 266, 270 on the distal end of the arm 30 are inserted into the gaps between the flanges 210, 210a of the hinge pins 206, 206a and the hinge members 172, 174 on the automobile body. Since the hinge pins 206, 206a are partly fitted in the recesses 266a, 270a of the first and second pulling members 266, 270, the flanges 210, 210a of the hinge pins 206, 206a can securely be engaged by the distal ends of the first and second pulling members 266, 270.

Substantially at the same time, the cylinders 68, 68a of the first holder means 60, 60a are operated in the direction of the arrows to enable the piston rods 70, 70a to turn the connectors 250, 250a about the respective pins 82, 82a. The clamps 252, 252a on the connectors 250, 250a are moved toward the door A and engage the same near the window opening.

The cylinders 92, 92a of the second holder means 84, 84a are operated in the direction of the arrows to enable the piston rods 94, 94a to turn the connectors 96, 96a about the pins 104, 104a, respectively. The clamps 98, 98a on the connectors 96, 96a are swung to hold the lower edge of the door A. The door A is now held by the arm 30 of the door detaching mechanism.

The first and second pulling members 266, 270 are displaced toward each other to pull the hinge pins 206, 206a out of the hinge members 168, 172 and 170, 174. More specifically, the cylinder 152 is operated to lower the piston rod 154, which causes the plate 264 to lower the first pulling member 266 into engagement with the flange 210 of the hinge pin 206. The flange 210 is lowered by the first pulling member 266 until the hinge pin 206 is pulled down out of the hinge members 168, 172. Simultaneously, the cylinder 160 is driven to elevate the piston rod 162 for thereby lifting the second pulling member 270 through the plate 168, whereupon the hinge pin 206a is pulled up from the hinge members 170, 174. Then, the main body 22 is moved to release the hinge members 168, 170 on the door A from the hinge members 172, 174 on the automobile body, thus detaching the door A from the automobile body.

With the arrangement of the present invention, as described above, when a rigged door is to be attached to an automobile body, hinge pins are first supported on the hinge members on the automobile body by the hinge pin support mechanism, and then the hinge pins are pushed into the hinge members. After the hinge pins have been inserted, they are automatically prevented from dropping off. The hinge pins can be pressed into the hinge members by the pressers of the assembling mechanism after the door has been engaged by the automobile body by the assembling mechanism. Thus, the process of inserting the hinge pins and the process of retaining the hinge pins are simultaneously carried out, with the result that the door attaching procedure is simplified and can be performed automatically.

The assembling mechanism holds the door by moving the fingers into fitting engagement with the hinge members on the door and the engaging pin into engagement with the striker of the door, all inwardly of the door. Further, the door is securely held additionally by the suction discs adhered to the window glass sheet of the door and the clamps engaging the lower edge of the door. Since no door holder means engages the outer side of the rigged door, the paint coating of the door is not damaged. Doors of different shapes required to be installed on different automobile types can be held by the assembling mechanism simply by moving either one of the fingers. Accordingly, the door assembling operation can easily be automated, and the production efficiency can be increased. Moreover, no additional jigs are needed to hold doors of different shapes. As a consequence, the cost of manufacture of automobiles can be reduced.

For detaching a door temporarily installed on an automobile door with hinge pins, the robot arm movable in any desired directions supports thereon door holder means, fingers for fitting into the hinge members on the door to position the door holder means with respect to the door, and pulling members for pulling the hinge pins out of the hinge members. The fingers support thereon pressers for pressing the distal ends of the hinge pins to produce gaps between flanges of the hinge pins and the hinge members on the automobile body, so that the pulling members can be inserted into the gaps. Accordingly, the hinge pins can automatically be pulled out without manual intervention. Inasmuch as the door can be detached highly efficiently, the efficiency of production of automobiles can be increased.

The hinge pin to be inserted into the hinge members on the automobile body and the hinge pin for coupling the door to the automobile door is supported in advance on one end of the hinge member on the automobile body by a hinge pin support member. The hinge pin support member includes a taper ring and teeth for preventing the hinge pin from dropping off when the hinge pin has been inserted into the hinge members to a prescribed extent. Guides are mounted in the hinge member on the door for guiding the hinge pin as it is inserted into the hinge members. Therefore, the hinge pin can smoothly be guided by the guides when it is inserted into the hinge members.

The hinge pin is prevented from dropping off by means of the taper ring and the teeth simply by forcibly inserting the hinge pin into the hinge members with the presser. It is thus unnecessary to effect a complex process to insert the hinge pin and retain the same against accidental removal within a small space between the automobile body and the door. The process of attaching the door to the automobile body can be not only simplified, but also performed automatically, with a resulting increase in the rate of production of automobiles.

The hinge pins may be pressed into the hinge members manually or by any of various other instruments or tools than the illustrated pressers.

Although a certain preferred embodiment has been shown and described, it should be understood that many changes and modifications may be made therein without departing from the scope of the appended claims.

What is claimed is:

1. A mechanism for coupling a first hinge member disposed on an automobile body and a second hinge member disposed on a door to mount said door on said automobile body, said mechanism comprising:
   a pin for coupling said first and second hinge members, said pin having a first end and a second end;
   hinge pin support means adapted to be disposed on one of said first and second hinge members for guiding and receiving said pin which couples said first and second hinge members, said hinge pin support means being of a hollow structure having a plurality of shear-off legs and a central hole;
   said hinge support means further comprising a ring member supported by said shear-off legs, said ring member comprising an axial hole for receiving said first end of said pin and temporarily retaining said pin adjacent one of said first and second hinge members;
   the arrangement being such that while said first and second hinge members are being aligned with each other, said first end of said pin is forcibly pressed into said axial hole of said ring member and is received therein such that said first end projects into said central hole, and wherein, when said pin is further pressed into said first and second hinge members, said ring member is sheared off said legs so that said ring member and said pin are forced through said first and second hinge members, whereby said ring member engages one of said first and second hinge members while retaining said hinge pin in said first and second hinge members against removal, whereby said first and second hinge members are coupled to each other.

2. The mechanism according to claim 1, wherein said ring member has a recess, said ring member being spreadable radially outwardly by said first end of said pin to allow said pin to be inserted therethrough when said pin is pressed.

3. The mechanism according to claim 2, wherein said hinge support means has at least one tooth for holding said second end of said pin after said pin has been inserted through said first and second hinge members to prevent said pin from removal from said first and second hinge members.

4. The mechanism according to claim 2, wherein said ring member has at least one flexible tongue projecting radially inwardly into said axial hole.

* * * * *

UNITED STATES PATENT AND TRADEMARK OFFICE
CERTIFICATE OF CORRECTION

PATENT NO. : 5,033,163
DATED : July 23, 1991
INVENTOR(S) : Shigeo KAIBUKI, Shinpei WATANABE, Mitsugu TAKAHASHI, and Hiroshi MORIYA It is certified that error appears in the above-identified patent and that said Letters Patent is hereby corrected as shown below:

ON TITLE PAGE: "[75] Inventors"
change the name of the third inventor "Mitsuga Takahashi;" to -- Mitsugu Takahashi; --

Signed and Sealed this

Fourth Day of August, 1992

*Attest:*

DOUGLAS B. COMER

*Attesting Officer*     *Acting Commissioner of Patents and Trademarks*